United States Patent
Lee (10) Patent No.: US 12,522,151 B2
(45) Date of Patent: Jan. 13, 2026

(54) FOLDABLE TRUCK RACK

(71) Applicant: Covina Accessories, LLC, Ontario, CA (US)

(72) Inventor: John Lee, Walnut, CA (US)

(73) Assignee: Covina Accessories, LLC, Ontario, CA (US)

( * ) Notice: Subject to any disclaimer, the term of this patent is extended or adjusted under 35 U.S.C. 154(b) by 382 days.

(21) Appl. No.: 18/468,390

(22) Filed: Sep. 15, 2023

(65) Prior Publication Data

US 2025/0091522 A1 Mar. 20, 2025

(51) Int. Cl.
- B60R 9/00 (2006.01)
- B60R 9/045 (2006.01)
- B60R 9/06 (2006.01)

(52) U.S. Cl.
CPC ............... B60R 9/06 (2013.01); B60R 9/045 (2013.01)

(58) Field of Classification Search
CPC .............. B60R 9/00; B60R 9/045; B60R 9/06
USPC ............................................................ 296/3
See application file for complete search history.

(56) References Cited

U.S. PATENT DOCUMENTS

| | | | |
|---|---|---|---|
| 8,777,288 B2* | 7/2014 | Johnasen | B60R 9/08 296/3 |
| 11,752,946 B2* | 9/2023 | Kang | B60R 9/10 224/321 |
| 2020/0398764 A1* | 12/2020 | Ni | B60R 9/06 |
| 2023/0249625 A1* | 8/2023 | Van Straten | B60R 9/055 224/314 |

* cited by examiner

*Primary Examiner* — Steven O Douglas
(74) *Attorney, Agent, or Firm* — Jen-Feng Lee, Esq.

(57) ABSTRACT

Present invention teaches a foldable truck rack that can be collapsed down when not in use, saving gas consumption and adding flexibility of space utilization of the bed portion of a pickup truck. One configuration allows the top horizontal bar to be lowered down with two upright bars sliding towards each other, until the top horizontal bar completely folded on top of the two upright bars, reducing the physical volume of the truck rack. A second configuration is made up of two half-bars to form a straight top horizontal bar, secured by a bracket with two lug nuts. When the two half-bars are folded down in a lateral axial direction to the corresponding upright bars, they are then pivoted down in a longitudinal direction towards base pieces, resulting in wide open space of a truck bed for more versatile use.

8 Claims, 9 Drawing Sheets

FOLDABLE TRUCK RACK

BACKGROUND OF THE INVENTION

Present invention disclosed and claimed a foldable truck rack that is normally installed to the flat bed portion of a vehicle, such as a pickup truck.

Truck racks have been around for quite a while; they are useful for loading and transporting different products. They increased the load capacity of a vehicle, as well as adding more points of tying down and securing things during transportation.

However, presently available truck racks, despite having different shapes and configurations, are fixed in place once installed to the bed portion of a vehicle, such as a pickup truck. When not in use, they generate substantial wind resistance that negatively affect the gas mileage of the vehicles. The increased gas consumption may become quite noticeable in long-haul higher or speed driving, though it may not be obvious in short-haul or city driving.

Also, the flexibility of allowing the truck rack to be folded down creates more open space in the cargo or bed portion of a pickup truck, providing more options and ways for loading and transportation needs, in addition to the gas saving briefly addressed herein.

As such, the present invention teaches and discloses foldable truck racks, shown in the two embodiments herein, that achieve the advantages stated herein.

SUMMARY OF THE INVENTION

The invention relates to truck racks for installing on the truck bed of a pick-up truck, or other utility vehicles. Such truck rack is foldable in two slightly different fashions, as shown in the two exemplary embodiments disclosed herein.

A first embodiment folds down the truck rack by sliding two upright bars, having slidable connection to a top horizontal bar, towards each other, resulting in the reduction of the height of the top horizontal bar when the folding/collapsing action is being done.

The top horizontal bar has a long channel that is sized to snugly receive the two upright bars, at least partially, to reduce the total volume of the truck rack in a folded down configuration.

Two elbow pieces are provided for securing to a truck bed. Each elbow piece has a lower arm portion and an upper arm portion. The lower arm portion is for connecting/installing to the truck bed; the upper arm portion of the elbow piece has a pivotal connection to a bottom end of each of the upright bars. Said elbow pieces are formed with an angle of between 75 and 115 degrees between the two arms of the elbow pieces.

A plurality of locking pins serve to secure and set the foldable truck rack in the erected position. The locking pins can be inserted into selected holes on the top end of the upright bars and through selected holes on the top horizontal bar, when setting/erecting the truck rack.

The slidable connection between the top end of an upright bar and the top horizontal bar can be made by a position pin that is set on top end of the upright bar, with 2 rollers fixed to the outside ends of the position pin and to form the slidable engagement relationship within the long channel of the top horizontal bar.

To collapse down the foldable truck rack of present embodiment, a person can remove locking pins, so that the top ends of the two upright bars can slide towards each other from the two outside ends of the top horizontal bar, while the height of the top horizontal bar gradually comes down. For ease of human handling without using any tools, the four locking pins can be made to have a turnable knob construction. Additionally, the locking pins can further have screw threads machined onto them for easy and secure connection to lock the setup of the truck rack in place.

The elbow pieces, in addition to having a pivoting connection to a bottom end of each of the two upright bars, have holes to keep the locking pins in place when the truck rack is collapsed down, with no need for the locking pins to secure the upright bars to the top horizontal bar.

A second embodiment of the foldable truck rack provides the fold-down mechanism in two pivoting planes that are at a 90-degree arrangement: the top horizontal bar is separated into two half-bars then pivot/rotate down to the connected upright bars in a lateral axis direction, and then the two folded-in halves are then pivoted/rotated down towards the truck bed in a longitudinal axis direction, i.e. parallel to the lengthwise direction of the vehicle body.

This embodiment is done by having two half-bars joined in a straight-line fashion to form a top horizontal bar, using a bracket and at least two lug nuts to secure and tighten the bracket to the two half-bars.

The structure and progressive actions of folding down can be seen in figures presented herein.

Each of the two half-bar has a short channel in the underside for snugly fitting the width of the upright bars, so that when the truck rack is folded down, the physical volume is minimized due to the half-bars overlapping, at least partially, onto the outside of the upright bars.

Two base pieces serve to secure the truck rack to a truck bed. The base pieces have pivotal connection, via the top end of a side rod, to a bottom end of each of the two upright bars. An elongated groove provides for a side rod's lower end to move back-and-forth.

There are two locking pins for securing the two upright bars to the top horizonal bar. Similar to the first embodiment, the locking pins can be made into turn knob shape for easier human handling.

During the setup or collapse operation of the truck rack of present application, the lower end of the side rod will side back and forth within the space, in a longitudinal direction (lengthwise to the truck body) as defined by the elongated groove, corresponding to the actions of the setup, or the collapse down, of the truck rack.

Each side rod further has a side locking nut for securely locking the lower end of the side rod in a fixed spot within the groove when the truck rack is fully erected for normal working, or for locking the collapsed truck rack in place.

The top horizontal bar, in either the first or the second embodiment, can have optional fold-down stopper pieces that are pivotably connected to two outside ends of said top horizontal bar, serving to limit/secure products/things that are being placed on the rack during normal use. When not in use, these 2 stopper pieces can be folded down towards the horizontal bar.

BRIEF DESCRIPTION OF DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows:

FIG. 1b is the side view of the foldable truck rack shown in FIG. 1a.

FIG. 6b shows the channel portion of the top horizontal bar receiving, at least partially, the upright bar, with the top upright bar having a slight different shape than that of FIG. 6a.

FIG. 7b is the side view of the foldable truck rack shown in FIG. 1a.

FIG. 10b shows the side view of the folding down truck rack of FIG. 10a.

DETAILED DESCRIPTION OF THE INVENTION

The foldable truck rack of present invention allows for the folding down in two configurations. The first configuration folds vertically down, resulting in a top horizontal bar 100 overlapping, at least partially, upright bars 40. The second configuration rotates/pivots two half bars 50 in a lateral axis direction, then the folding changes to a longitudinal direction, as well be more fully explained below.

A first embodiment of the foldable truck rack in present application is comprised of two upright bars 40 that support a top horizontal bar 100; said top horizontal bar 100 further has a long channel 99 formed in its under portion substantially throughout the full length of the top horizontal bar 100.

Figure 1A:
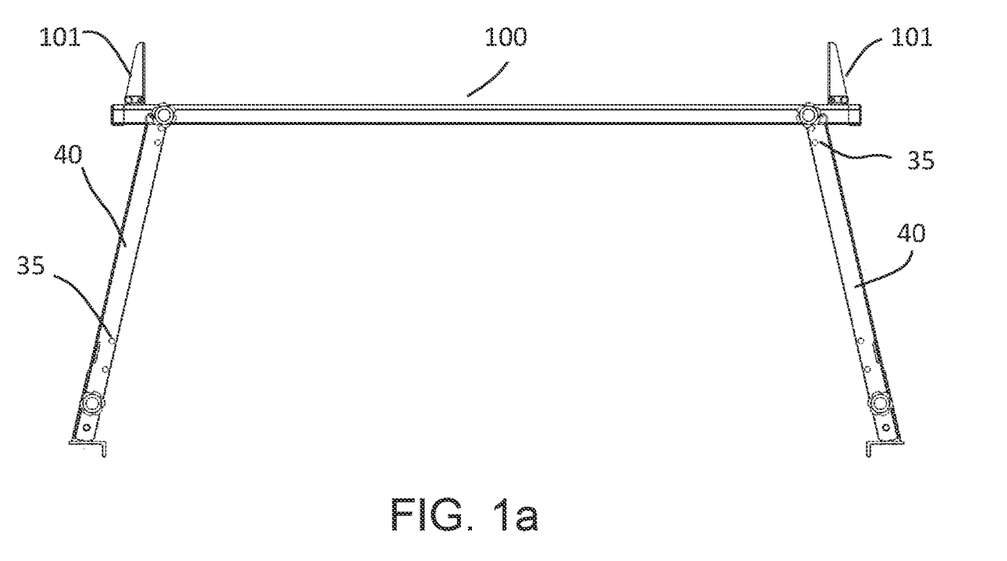
FIG. 1a is the frontal view of the foldable truck rack in its erected status, for the first configuration.
Figure 1B:
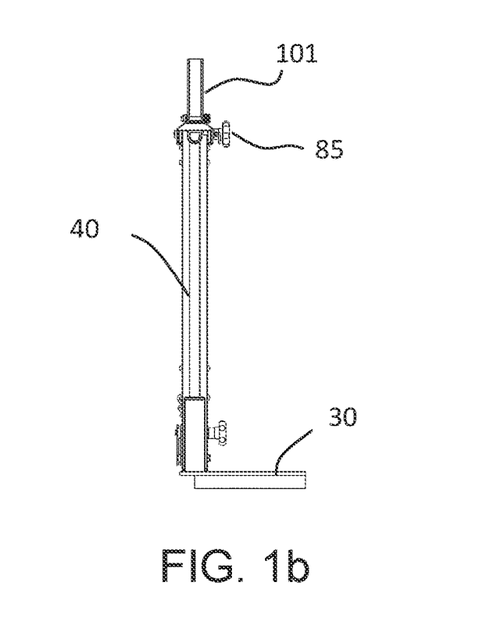

The two upright bars 40 are slidably connected to the top horizontal bar 100 wherein a top end of each of the upright bars 40 is slidably fitted into the long channel 99 of the top horizontal bar 100. FIGS. 1a, 2, 3 and 4 shown this main structure of two upright bars 40 connecting to and supporting a top horizontal bar 100, as well as the sequential phases of the truck rack being folded down. FIG. 1b is the sideway view of FIG. 1a when the foldable truck rack is fully erected.

Figure 3:
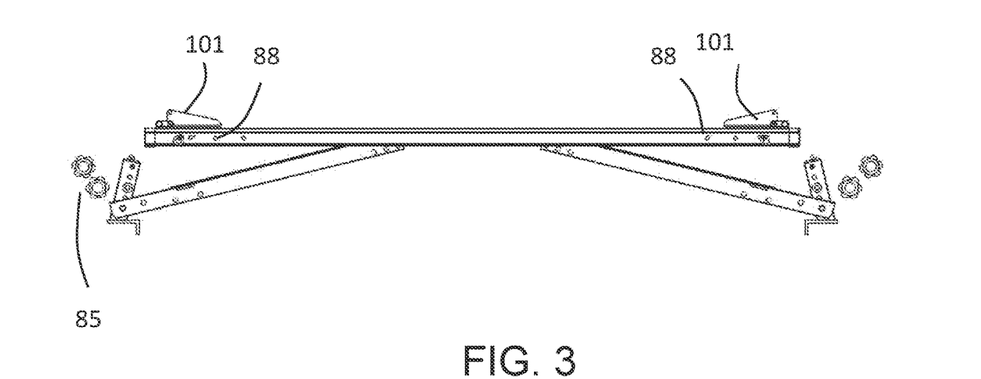
FIG. 3 is the fontal view of the foldable truck rack being collapsed down, nearing completion, for the first configuration.

A plurality of position holes 88 are formed along the length of the horizontal bar 100; this is shown in FIG. 3.

The truck rack has two elbow pieces 30 for securing to a truck bed, said elbow pieces 30 are formed with an angle of between 75 and 115 degrees between the upper and lower arms of the elbow pieces 30. The lower arm portion of the elbow piece is for connection/installation to the truck bed; the upper arm portion of the elbow piece 30 provides for the pivotable connection to a bottom end of each of the upright bars 40. The elbow pieces 30 will be generally blocked from easy view in a setup state as the body of the truck rack (particularly the two upright bars 40) will obstruct the view. From FIGS. 2 to 4, the elbow pieces 30 become more visible as the truck rack goes through the progressive steps of collapsing down.

There are at least two locking pins 85 for securing and setting the foldable truck rack in the erected position. The elbow pieces 30 have a plurality of holes 38 for purpose of keeping locking pins 85 in place when they are not inserted to lock the foldable truck rack in the erected state or the collapsed stated. The holes 38 can also serve to assist in the setting up of the truck rack with additional locking pins 85 as explained below.

At least one hole 35 is formed on the top end and on the bottom end of each of the upright bars 40, so that locking pins 85 can be inserted into the holes 35 on the top end of upright bars 40 and through the holes 88 of the top horizontal bar 100, to set the truck rack into an erected status.

Additionally, some holes 35 on the bottom end of the upright bars 40 can accommodate/receive additional locking pins 85 for insertion through holes 35 and onto the elbow pieces to assist and increase the strength of the erected status of the truck rack.

Figure 6A:
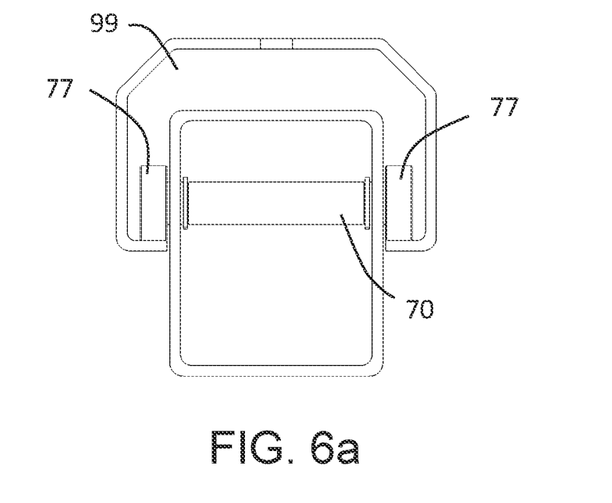
FIG. 6a shows the channel portion of the top horizontal bar receiving, at least partially, the upright bar, for the first configuration.
Figure 6B:
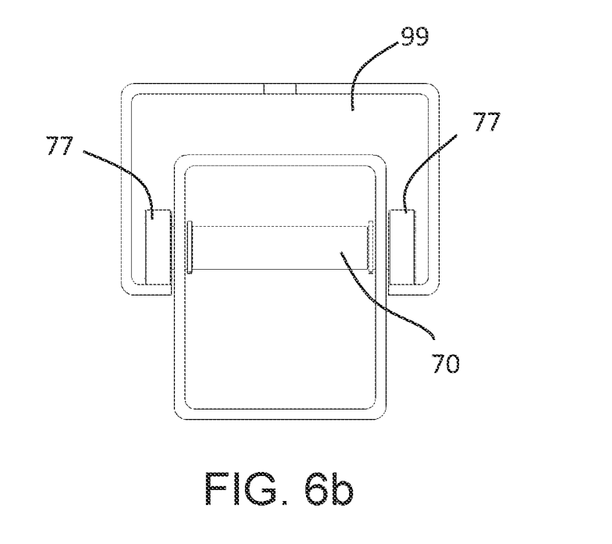

The slidable connection between the top end of an upright bar 40 and the top horizontal bar 100 can be made by a position pin 70 that is set on top end of the upright bar 40, with 2 rollers 77 fixed to the outside ends of the position pin 70 and to form the slidable engagement relationship within the long channel 99 of the top horizontal bar 100, as shown in FIGS. 6a and 6b. The two FIGS. 6a and 6b present slightly different outside shape for the top horizontal bar 100.

As can be seen in FIGS. 6a and 6b, the long channel 99 is sized in a way to snugly fit the width of the two upright bars 40, so that the top end of the upright bars 40 can slide within the long channel 99 during the erecting and collapsing operations. Additionally, when the foldable truck rack of present embodiment is fully collapsed down, the two upright bars 40 are snugly fitting into, at least partially, the long channel 99, reducing the physical volume substantially.

To collapse down the foldable truck rack of present embodiment, a person can remove (pull out) the locking pins 85, so that the top ends of the two upright bars 40 can slide towards each other from the two outside ends of the top horizontal bar 100, while the height of the top horizontal bar 100 gradually comes down, as shown in FIGS. 1a to 2 to 3 and to 4 sequentially.

For ease of handling without using any tools, the locking pins 85 can be made to have a turnable knob construction, so that a human hand can easily grab the locking pins 85 to insert into the holes 88 on the top horizontal bar 100 and into the holes 35 on the upright bars 40 to securely set up the truck rack for normal usage and operation. Additionally, the locking pins can further have screw threads machined onto them for easy and secure connection to lock the setup of the truck rack in place.

Additionally, the top horizontal bar 100 further having two fold-down stopper pieces 101 that are pivotably connected to two outside ends of said top horizontal bar 100. A sideview FIG. 1b is shown, to indicate the corresponding stopper pieces 101 being in erected position as clearly viewable in FIG. 1a.

Figure 2:
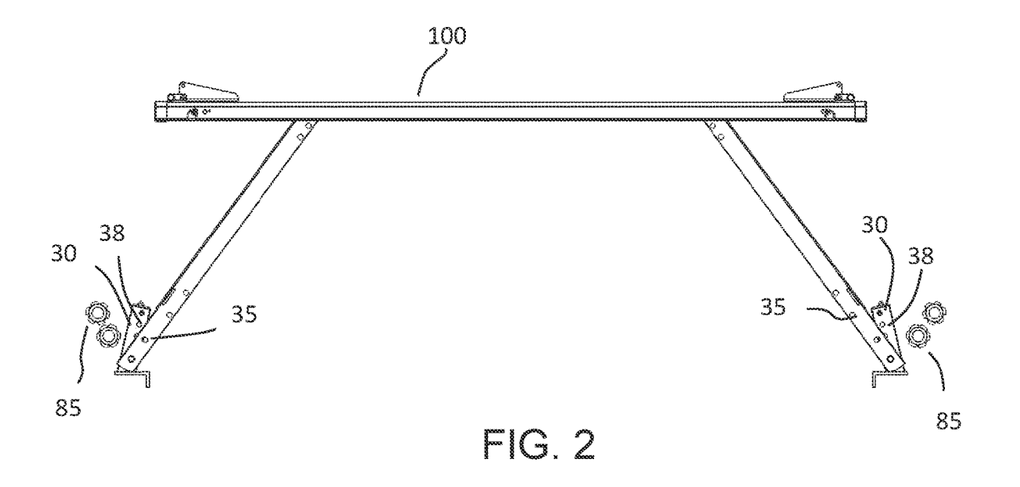
FIG. 2 is the frontal view of the foldable truck rack being collapsed down, for the first configuration.
Figure 4:
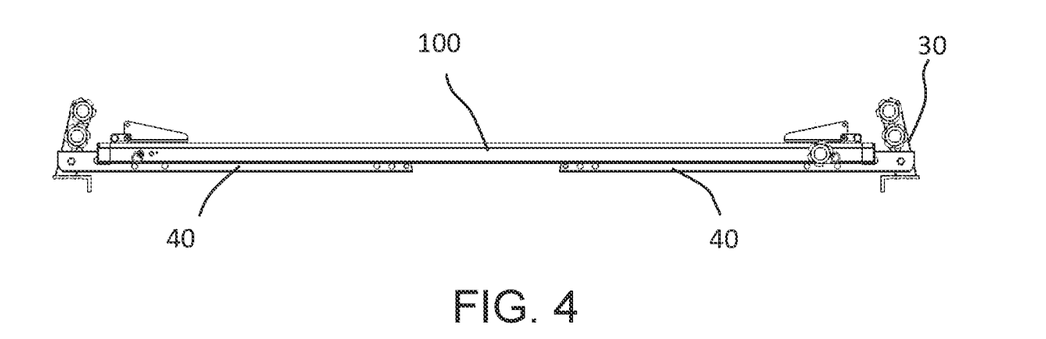
FIG. 4 is the front view of the foldable truck rack in a state of complete folded down, for the first configuration.

These two stopper pieces can serve to limit/secure products/things that are being placed on the rack during normal use. When not in use, these two stopper pieces can be folded down towards the horizontal bar 100, as shown in FIGS. 2, 3 and 4.

Figure 5:
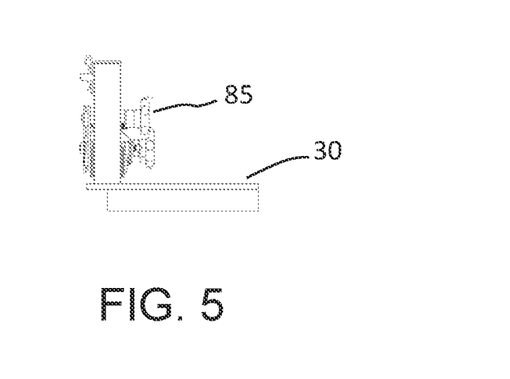
FIG. 5 is the side view of the folded truck rack shown in FIG. 4.

When fully folded/collapsed down, a minimized physical volume is shown in FIG. 5, as a side view to show the profile. The locking pins 85, in the form of turn knobs, can be seen to be kept on the elbow pieces 30.

Another embodiment of the foldable truck rack of present application has slightly different configuration.

Figure 7A:
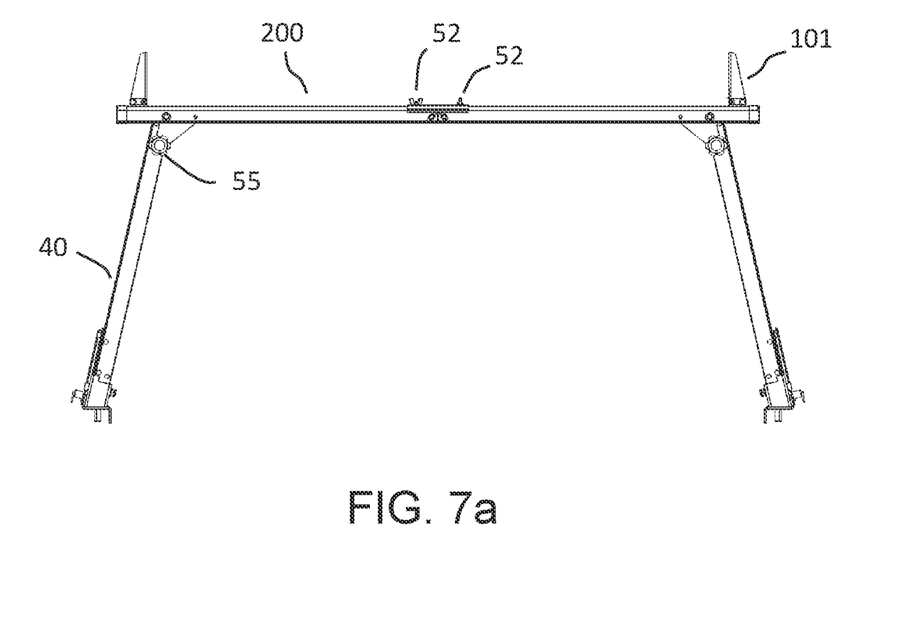
FIG. 7a is the frontal view of the foldable truck rack in its erected status, for the second configuration.
Figure 8:
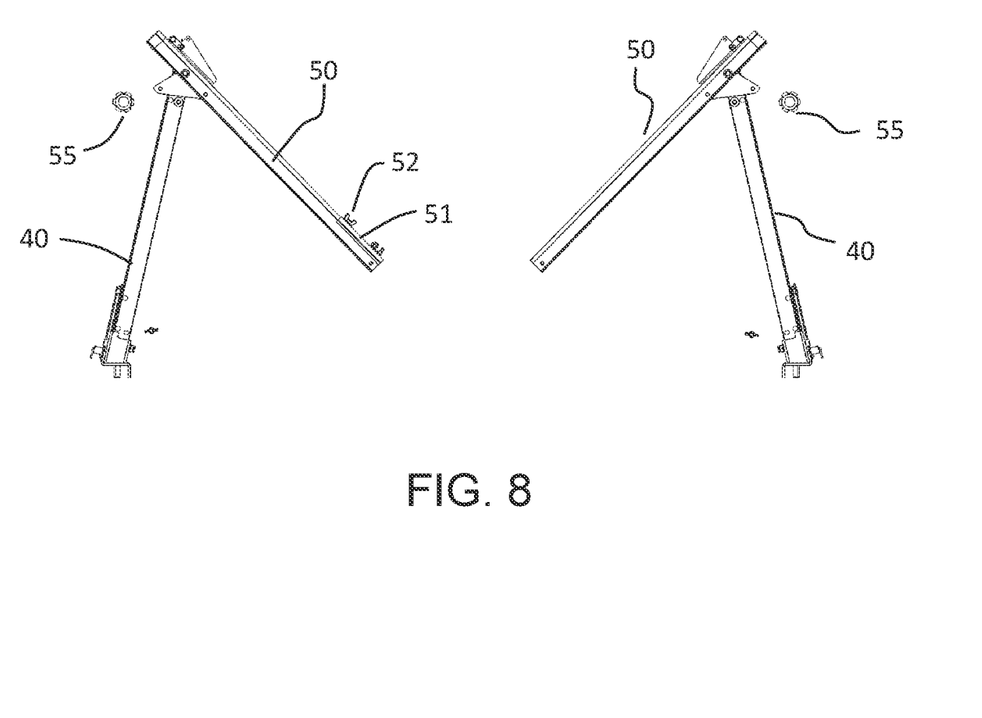
FIG. 8 shows the half way status of the truck rack being folded down, for the second configuration.

Mainly, two half-bars 50 can be joined in a straight-line fashion to form a top horizontal bar 200, as shown in FIGS. 7a and 8. At the inside ends of the two half-bars 50, they are joined together by a bracket 51; at least 2 lug nuts 52 are employed to secure and tighten the bracket 51 to, and connect, the two half-bars 50.

When the truck rack is to be collapsed down, the bracket 51 will be moved/slided towards one of the two half-bars 50 and be secured to that position using the two lug nuts 52, as shown in FIG. 8.

Figure 7B:
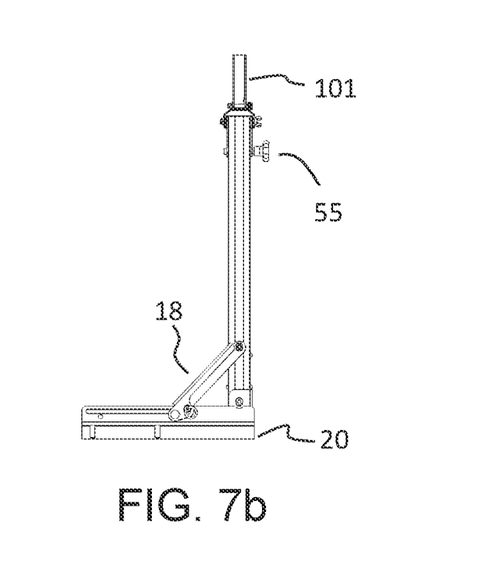

Two upright bars 40 each with a top end having a pivotal connection to an outside end of each of the two half-bars 50, so that when the bracket 51 is not joining the two half-bars 50 together, the two half-bars 50 are folded down, at the respective pivotal connection points, towards the correspondingly connected upright bars 40, in a lateral axis direction. Such progressive actions of folding down can be seen in FIGS. 7a, 8 and 9. The side profile view of the present embodiment, at fully erected state of FIG. 7a, is shown in FIG. 7b.

Each of the two half-bar 50 has a short channel 49 in its underside for snugly fitting the width of the correspondingly connected upright bars 40, so that when the truck rack is folded down, the physical volume is minimized due to the half-bars 50 overlapping, at least partially, onto the outside of the upright bars 40. FIGS. 10a, 10b, 11 and 12 show the way an upright bar 40 is folded into the short channel 49 of the half-bar 50.

Two base pieces 20 serve to secure the truck rack to a truck bed. The base pieces 20 have pivotal connection to a bottom end of each of the two upright bars 40.

The pivotal connection enables a pivoting/rotating plane that goes along with the longitudinal axis direction (the lengthwise direction) of the vehicle (the pickup truck) whereas the two half-bars 50's rotating plane relative to the base pieces 20 is at a lateral axis direction (90-degree angle) to the lengthwise direction of the vehicle.

Figure 9:
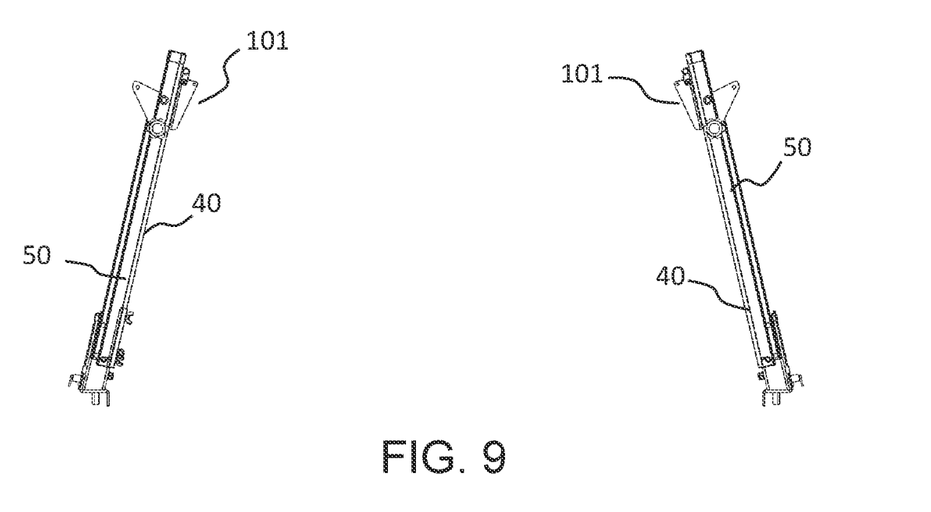
FIG. 9 shows the two half-bars completely folded down and onto the two upright bars, for the second configuration.
Figure 10A:
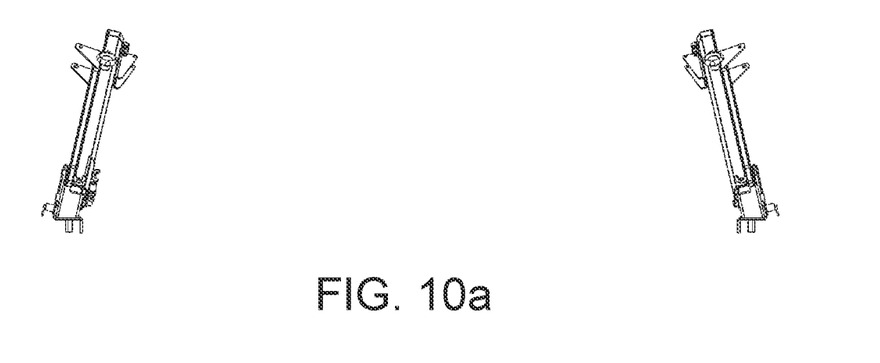
FIG. 10a shows the next folding down step from FIG. 9, in a longitudinal axis direction, for the second configuration.
Figure 10B:
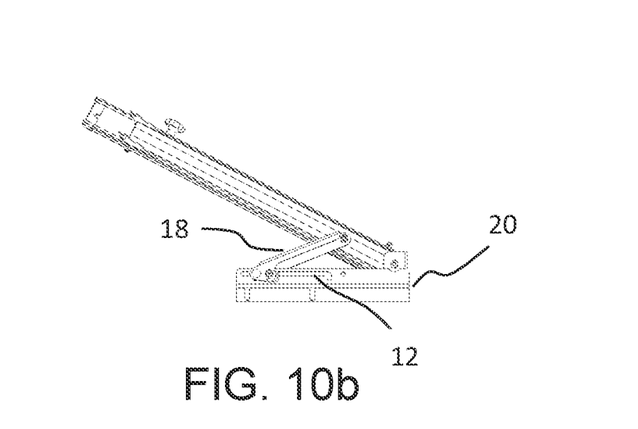
Figure 11:
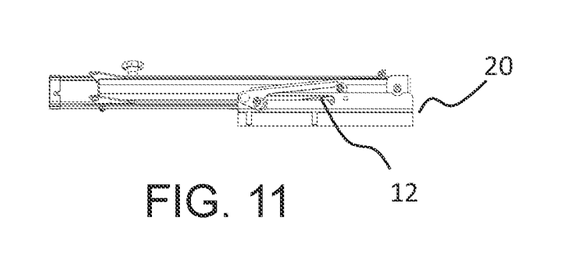
FIG. 11 shows the side view of the truck rack completely folded down, for the second configuration.

FIG. 8 shows the two half-bars 50 being rotatingly folded down in a lateral axial direction and FIGS. 9 and 10 show the two upright bars 40 (with the half-bars 50 already folded onto them) pivot/rotate in the longitudinal direction, as also shown in FIGS. 10b and 11.

There are two locking pins 55 for securing the two upright bars 40 to the top horizontal bar 200 (joined by the 2 half-bars 50). The locking pins can additionally have screw threads for easy and secure connection between the upright bars and the top horizontal bar 200.

There is an elongated groove 12 on each of the base pieces 20 so that two side rods 18 form a connection between a lower end of the upright bars 40 and in the elongated groove 12 of the base pieces 20, as shown in FIGS. 10b and 11. During the setup or collapse operation of the truck rack of present application, the lower end of the side rod 18 will slide back and forth within the space, in a longitudinal direction (lengthwise to the truck body) as defined by the elongated groove 12, consistent with the setup (or fold-down) actions.

Each side rod 18 further has a side locking nut 15 for securely locking the lower end of the side rod 18 in a fixed spot within the groove 12 when the truck rack is fully erected for normal working.

Figure 12:
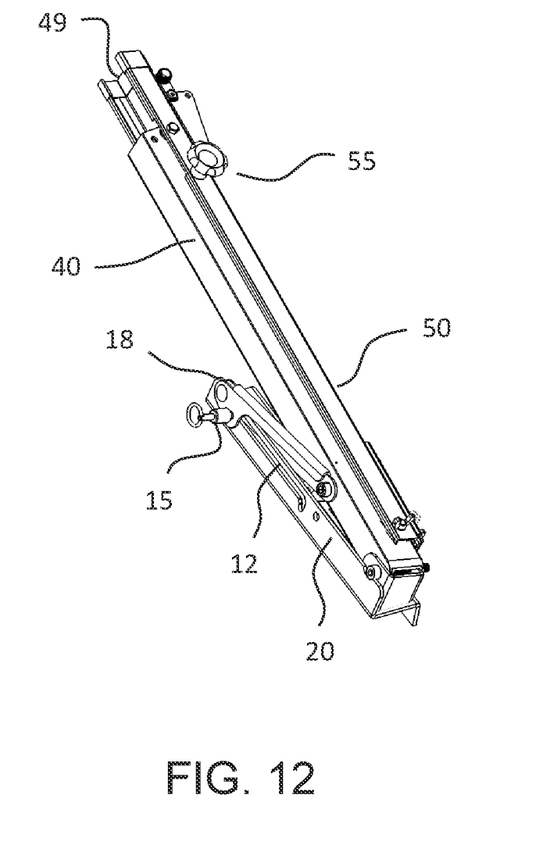
FIG. 12 shows one half-bar folded (lateral direction) to one corresponding upright bar, which then pivoting down (longitudinal direction) towards one corresponding base piece, for the second configuration.
Figure 13:
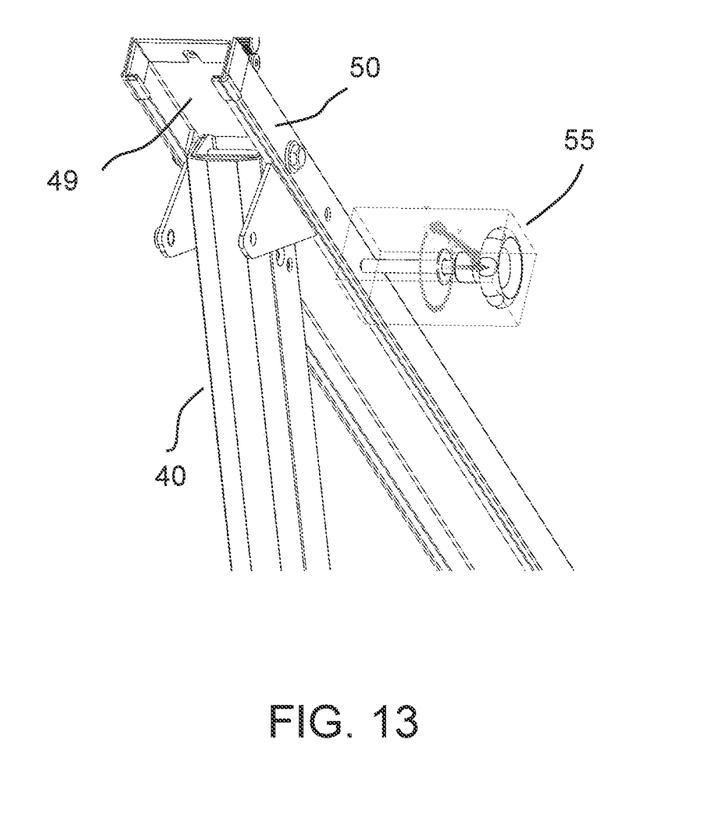
FIG. 13 is blown-up perspective view of the connection of one half bar with one corresponding upright bar, with a locking pin presented for selected holes, for the second configuration.

The collapsed state of the foldable truck rack of the second embodiment can be seen in FIG. 12. A blown-up side perspective view for the left-half of FIG. 8 is shown in FIG. 13, with the short channel 49 clearly visible for receiving one upright bar 40 into the short channel 49.

Similar to the first embodiment, locking pins 55 can be made to be a turn-knob shape for easier human handling by hand.

To collapse down the truck rack of the second configuration, unscrew the two lug nuts 52, remove the two locking pins 55, move/slide the bracket 51, rotate (lateral axis direction) the two half-bars 50 towards the correspondingly connected upright bars 40, then pivot (longitudinal axis direction) the folded-together structure towards the truck bed as guided by the side rod 18 while the lower end of the side rod 18 is sliding/moving along the space of the elongated groove 12.

To set up the truck rack, reverse the steps above.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A foldable truck rack for fitting to the bed portion of a pick-up truck, comprising:
   a top horizontal bar with a long channel in its under portion and with a plurality of position holes formed along the length of the horizontal bar;
   two upright bars with slidable connection to the top horizontal bar wherein a top end of each of the upright bars is slidably fitted into the long channel of the top horizontal bar;
   two elbow pieces for securing to a truck bed, said elbow pieces are formed with an upper arm and a lower arm, with the two arms having an angle of between 75 and 115 degrees, and the upper arm having pivotable connection to a bottom end of each of the upright bars; and
   a plurality of locking pins for securing and setting the foldable truck rack in an erected position wherein
   the top end of each of the upright bars has at least one hole so that the locking pins can be inserted into the holes to reach the erected position for the normal use of the truck rack.

2. The foldable truck rack of claim 1, wherein the bottom end of each of the upright bars has at least one hole so that additional locking pins can be used to insert into the holes to assist in the setting up of the truck rack.

3. The foldable truck rack of claim 1, wherein the locking pins further having a turnable knob portion for easy hand-held turning and/or tightening.

4. The foldable truck rack of claim 1, wherein the top horizontal bar further having two fold-down stopper pieces pivotably connected to two outside ends of said top horizontal bar.

5. A foldable truck rack for fitting to the bed portion of a pick-up truck, comprising:

a top horizontal bar formed by two half-bars joined together by a bracket with two or more lug nuts;

two upright bars each with a top end having a pivotal connection to an outside end of each of the two half-bars;

two base pieces for securing to a truck bed, said base pieces having pivotal connection to a bottom end of each of the two upright bars;

two locking pins for securing the two upright bars to the top horizonal bar; and two side rods, wherein each side rod has a top end and a lower end whereby the top end is pivotably connected to one upright bar and the lower end is slidably connected to an elongated groove on each of the two base pieces.

6. The foldable truck rack of claim 5, wherein the top horizontal bar further having two fold-down stopper pieces pivotably connected to two outside ends of said top horizontal bar.

7. The foldable truck rack of claim 5, wherein the two base pieces further having a lock nut on each of the side rod for securing the side rod to a selected position within said elongated groove.

8. The foldable truck rack of claim 5, wherein the locking pins further having a turnable knob portion for easy hand-held turning and/or tightening.

* * * * *